United States Patent [19]
Levengood

[11] 3,822,505
[45] July 9, 1974

[54] METHOD AND APPARATUS FOR INDUCING MORPHOGENETIC ALTERATIONS IN PLANTS

[75] Inventor: William C. Levengood, Grass Lake, Mich.

[73] Assignee: Sensors Incorporated, Ann Arbor, Mich.

[22] Filed: Mar. 27, 1972

[21] Appl. No.: 238,489

[52] U.S. Cl. .............................. 47/1.3, 219/10.81
[51] Int. Cl. ........ A01c 1/00, A01g 7/04, H05b 9/04
[58] Field of Search .............................. 47/1.3, 58

[56] References Cited
UNITED STATES PATENTS

| | | | |
|---|---|---|---|
| 784,346 | 3/1905 | Pilsoudsky et al. | 47/1.3 |
| 1,678,418 | 7/1928 | Bennett | 47/1.3 |
| 1,835,888 | 12/1931 | McCoy | 47/1.3 |
| 1,952,588 | 3/1934 | Golden | 47/1.3 |
| 2,040,161 | 5/1936 | Hidmann | 47/1.3 UX |
| 2,223,813 | 12/1940 | Brown | 47/1.3 UX |
| 2,308,204 | 1/1943 | Parry | 47/1.3 |
| 3,120,722 | 2/1964 | Keller | 47/1.3 |

FOREIGN PATENTS OR APPLICATIONS

| | | | |
|---|---|---|---|
| 1,090,011 | 11/1967 | Great Britain | 47/1.3 |
| 231,258 | 11/1968 | U.S.S.R. | 47/1.3 |

OTHER PUBLICATIONS

Michigan Farmer, Paul Courter, April 5, 1969, pp. 12, 34 "Magnetic Seed Treatment: Fantasy or Dream Come True"

Lund, Ed., Bioelectric Fields and Growth, University of Texas Press, 1947, pp. 200–202 and 204–217

Primary Examiner—Robert E. Bagwill
Attorney, Agent, or Firm—Woodcock, Washburn, Kurtz & Mackiewicz

[57] ABSTRACT

The process of and apparatus for treating plants to provide morphogenetic alterations which are transferred to succeeding generations by applying a predetermined gradient force field to a predetermined localized region on the plant wherein the field and the region are selected in accordance with the desired morphogenetic response.

15 Claims, 18 Drawing Figures

Fig. II

METHOD AND APPARATUS FOR INDUCING MORPHOGENETIC ALTERATIONS IN PLANTS

BACKGROUND OF THE INVENTION

In the field of agricultural science and applied horticultural, research attempts are constantly being made to develop plants with altered genetic characteristics. For example, in many applications it is desirable to develop a genetic strain with faster growth rates to provide crop yields in the shortest growing time. In other cases, as for example in fruit and vegetable crops increased yields as well as altered fruit size and quality becomes of practical importance. In the case of trees, faster and more vigorous growth is desired. In the decorative area, new plants with different colors and foliage characteristics are constantly in demand.

The vast majority of genetic studies with plants center around attempts to cross fertilize plants with those having the desired traits. This production of hybrids by cross-breeding is however a long and involved process with many generations of failures for each success. Numerous studies have also been made for many years concerning the role that electromagnetic radiation plays in the development of plants, their fruiting, and subsequent formation of seed. An article entitled "Electromagnetic Radiation Effects on Seeds" by S. O. Nelson, appearing in *Electromagnetic Radiation and Agriculture*, Conference Proceedings, October, 1965, pp. 60–63 points out that seed treatments with electromagnetic radiation at very low quantum energies, and, in fact, even with direct current electric and electrostatic fields, proceeded work with radiofrequency energy. The abbot, Nollet, has been credited with the first application of electric energy to seeds using an electric friction apparatus in 1747. It has also been recognized for some time that the presence of magnetic fields can alter biological processes in some forms of plant life. See "Sensitivity of Some Plant Material to Magnetic Fields", by Douglas W. Dunlop and Barbara L. Schmidt in *Biological Effects of Magnetic Fields*, (M. Barnothy, Editor), Plenum Press, New York, Publishers (1969), "Physiological and Chemical Features of Magnetically Treated Winter Wheat Seeds and Resultant Seedlings" by U. J. Pittman and D. P. Ormrod, May, 1970, *Canadian Journal of Plant Science*, Vol. 50, No. 3, pp. 211–217, 350 and 351, and "Biomagnetic Responses in Kharkov 22 M. C. Winter Wheat" by U. J. Pittman, *Canadian Journal of Plant Science*, Vol. 47 (1967) pp. 389–393.

SUMMARY OF THE INVENTION

The present invention is directed toward a process for inducing new expressions of economic importance in seed produced flowers, agronomic and vegetable crops. The types of new expressions contemplated are increased plant development (early maturity), increased fruit yield, altered rates of vegetative growth, improved fruit, and altered flower sizes and shapes.

Each of these new expressions or combination of expressions has significant economic value, many of which are obvious. Increased plant growth rate can lead to the farming of vegetable crops in geographical areas where the growing seasons are too short for rearing the conventional strains. Reduced vegetative growth can be useful in developing strains that have foliage configurations more amenable to harvesting. For example, reduced plant size in wheat is a good objective since lodging is often a severe problem that leads to significantly reduced yields. Also, vegetable strains now exist that are perfect in every way except they have an over abundance of foliage or too much vining which hinders mechanical harvesting. By reducing vegetative growth in these strains to cut down on the foliage, they will then be much more competitive in the seed market place.

In accordance with the present invention there is disclosed a process of and apparatus for treating plants to provide morphogenetic alterations which are transferred to succeeding generations which comprises applying a predetermined gradient force field to a predetermined localized region on the plant, the field and the region being selected in accordance with the desired morphogenetic response, and maintaining the region in the field for a time adequate to provide the desired alteration. In some applications the force field comprises a gradient magnetic field. In other applications the force field comprises a gradient electrostatic field and in further applications the force field comprises combined gradient magnetic and electro-static fields. In accordance with the desired morphogenetic response, the force field may be applied in one aspect of the invention to the meristematic region on the root tip, or it may be applied to the region of cell elongation and differentiation of mature tissue on the radicle, or the force field may be applied to the root-hypocotyl transition region or the force field may be applied to the apical meristem region. In further applications the force field may be applied to the lateral meristem, developing buds and flowers on the mature plants.

Heretofore, there has been no method for altering the expression of plants on a predictable basis. In accordance with the present invention, it has been found that decreased or increased growth rate can be produced predictably in beans, tomatoes, cucumbers, wheat, broccoli, sugar beets, alfalfa and trees, including orange and pine. In the decorative flowers, growth increases and early flowering have been observed in marigold, zinnia, carnation, Christmas cherry, snapdragon and ageratum. And further, evidence exists that this treatment process may be used to produce changes in almost all plant species including grass in a predictable manner.

It is a further object of the invention to provide a method for altering the genetic characteristics of plants to produce strains of differing characteristics, such as flower form, color, growth rate, and fruit yield, by means of a brief exposure to locally administered, high-gradient, magnetic and/or electrostatic fields using specially designed probes.

For further objects and advantages of the invention, reference is to be had to the following drawings taken in conjunction with the accompanying specification.

DESCRIPTION OF THE EMBODIMENTS

Figure 1:
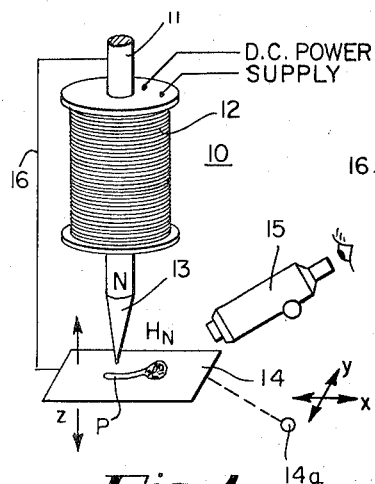
FIG. 1 is an illustration of a magnetic field generating apparatus having a N(north) orientation of field for treating a plant.

Referring to FIGS. 1–8, there are illustrated the various types of force fields and the generating apparatus for treating plants in accordance with the present invention. The various devices have been illustrated schematically and the corresponding parts in the various figures have been provided with the same reference characters. In FIG. 1, the device 10 comprises an elongated magnetic core 11 of suitable material, for example "Armco Ingot" iron, having positioned thereon a coil 12 of insulated copper wire. The lower end of the core 11 is formed in the shape of a probe 13 which tapers to a tip. By way of example, but not of limitation, a suitable device 10 had a core 11 of about 20 cm. in length and 12 mm. diameter at one end of which was a conical portion of about 2.5 cm. in length tapering to a tip diameter of 0.125 mm. Positioned on the core above the tip about 4.5 cm. was a coil 12 of 80,000 turns of No. 34 insulated copper wire. The coil had a diameter of 8 cm. and a length of 10 cm. The device had an operating current from 0 to 15 milliamps from a variable D.C. power supply with a measured field, as measured by F. W. Bell, Inc., Model 110, gaussmeter, at about 0.4 mm. from the tip of the probe 13 of about 800 gauss at 12 milliamps current, FIG. 9. The field gradient in the first 2 mm. from the probe axis was approximately 75 gauss/mm, FIG. 10. A platform or stage 14 of a non-magnetic metal is adapted for adjustable movement in the $x$ and $y$ directions by suitable means such as a micro-manipulator 14$a$ as indicated by the arrows. The adjustment of the platform 14 in the $z$ direction relative to the tip of probe 13 is associated with a telescope 15 with an ocular micrometer for adjusting the distance between the plant specimen and the tip of the probe.

With a plant specimen P placed on the platform 14, the stage is raised and adjusted until an air gap of about 0.03 to 0.5 mm. remains between the tip of probe 13 and the selected region or zone for treatment on the plant specimen P as determined by alignment with the reticle of the telescope 15. The tip of the probe 13 is directed at the selected predetermined localized region on the plant P and the field is then switched on for a predetermined duration of time as later discussed in detail. After exposure, the platform 14 is lowered before the current to the coil 12 is switched off.

Figure 2:
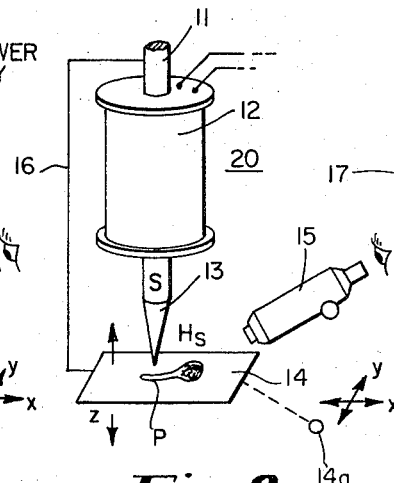
FIG. 2 is an illustration of a magnetic field generating apparatus similar to FIG. 1 but having an S (South) orientation of field.

In the device illustrated in FIG. 1, the magnetic field H of the coil 12 is such that the probe 13 has a north (N) orientation. In FIG. 2 there is shown a device 20 similar to that shown in FIG. 1 with the exception that the orientation of the magnetic field H is south (S) for the probe 13. In both FIGS. 1 and 2 an electrical short by way of conductor 16 between the core 11 and the metallic stage 14 is utilized to prevent a build up of stray electric fields between the probe tip 13 and the specimen support 14.

Figure 3:
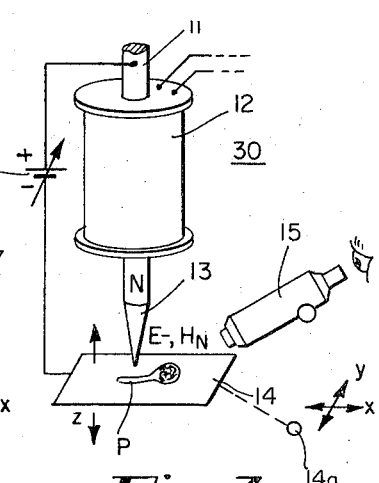
FIG. 3 is an illustration of a combined magnetic and electric field generating apparatus in which the orientation of the magnetic field is N (North) and the orientation of the electrostatic field is negative (−)
Figure 4:
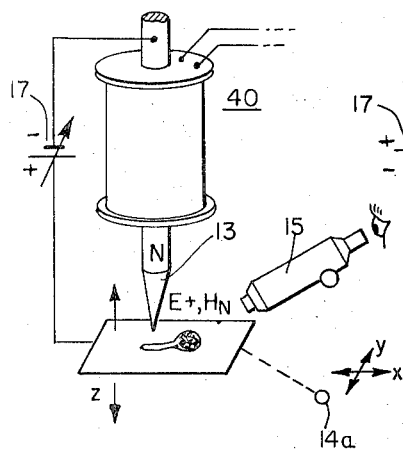
FIG. 4 is an illustration of a combined magnetic and electric field generating apparatus similar to FIG. 3 except the orientation of the electric field is positive (+)
Figure 5:
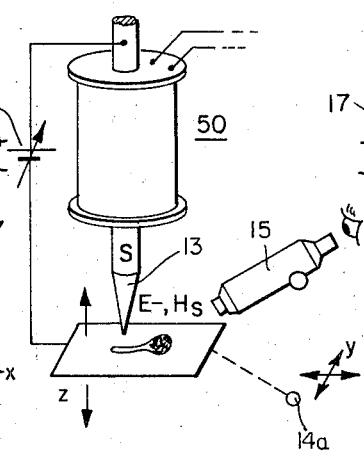
FIG. 5 is an illustration of a combined magnetic and electric field generating apparatus similar to FIGS. 3 and 4 except the orientation of the magnetic field is S (South) and the orientation of the electric field is negative (−)
Figure 6:
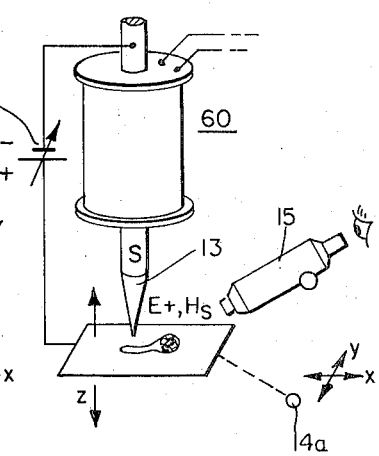
FIG. 6 is an illustration of a combined magnetic and electric field generating apparatus according to the present invention similar to FIG. 5 except the orientation of the electric field is positive (+)

In FIG. 3 there is shown a device 30 which is similar to the device 10 shown in FIG. 1 and has the same orientation of its magnetic field H. In addition, device 30 has an electrostatic field E the voltage of which preferably is fed through the same core but is electrically insulated from the coil windings and is variable by a suitable source 17 from 0–600 volts DC. The electrostatic field is produced between the tip of the probe 13 and the platform 14 and as schematically illustrated in FIG. 3 the orientation of the electrostatic field E is negative (−). In FIG. 4, the device 40 is similar to the device 30 illustrated in FIG. 3 with the exception that the electrostatic field has an orientation which is positive (+). In FIG. 5, there is illustrated a device 50 which is similar to device 30 shown in FIG. 3 with the exception that the magnetic field H has a south (S) orientation. In FIG. 6, the device 60 is similar to that shown in FIG. 5 with the exception that its electrostatic field E has a positive (+) orientation.

Figure 7:
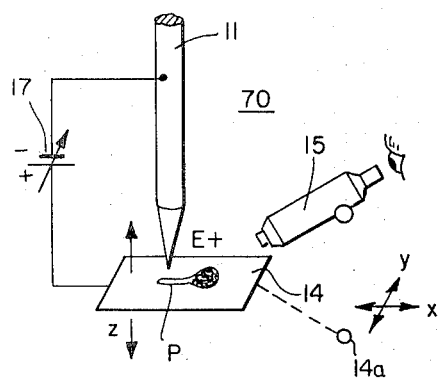
FIG. 7 is an illustration of an electric field generating apparatus embodying the present invention wherein the orientation of the electrostatic field is (−) negative.
Figure 8:
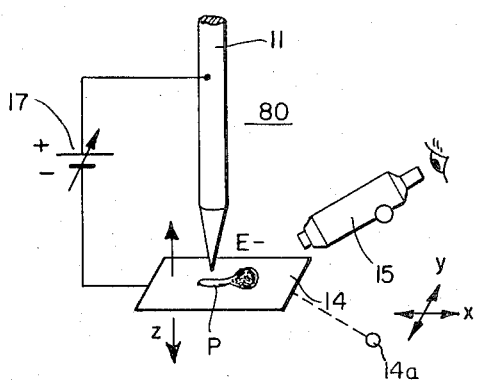
FIG. 8 is an illustration of an electrostatic field generating apparatus similar to FIG. 7 except the orientation of the electrostatic field is positive (+)

In FIG. 7, the device 70 does not include a magnetic coil and provides an electrostatic field (E) only. The orientation of the field for device 70 in FIG. 7 is negative (−). In FIG. 8, the device 80 is similar to that shown in FIG. 7 with the exception that the electrostatic field E has a positive (+) orientation.

Figure 9:
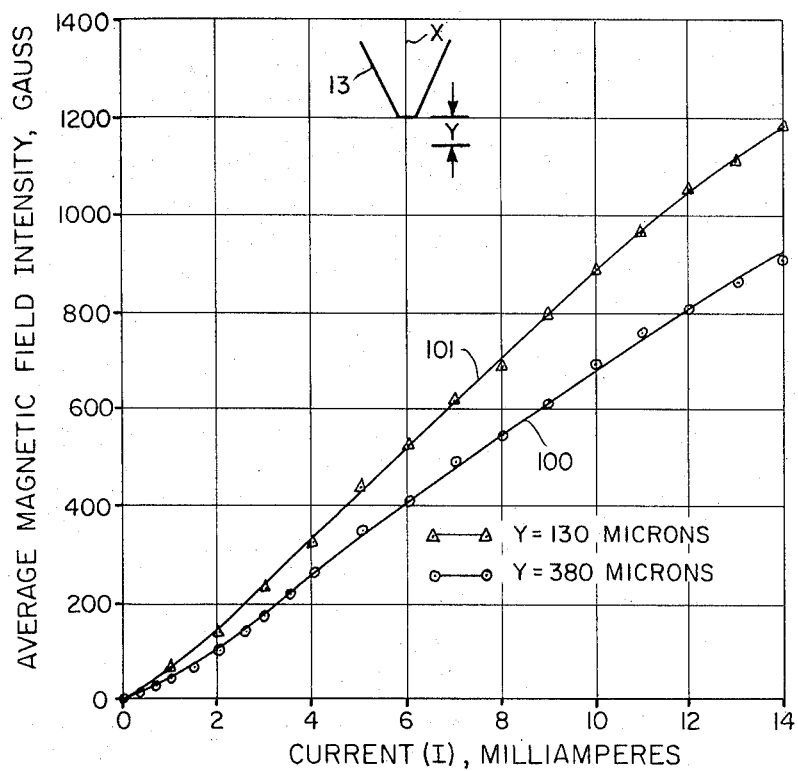
FIG. 9 is a curve showing the magnetic field intensity as a function of the current of the force field generating apparatus.
Figure 10:
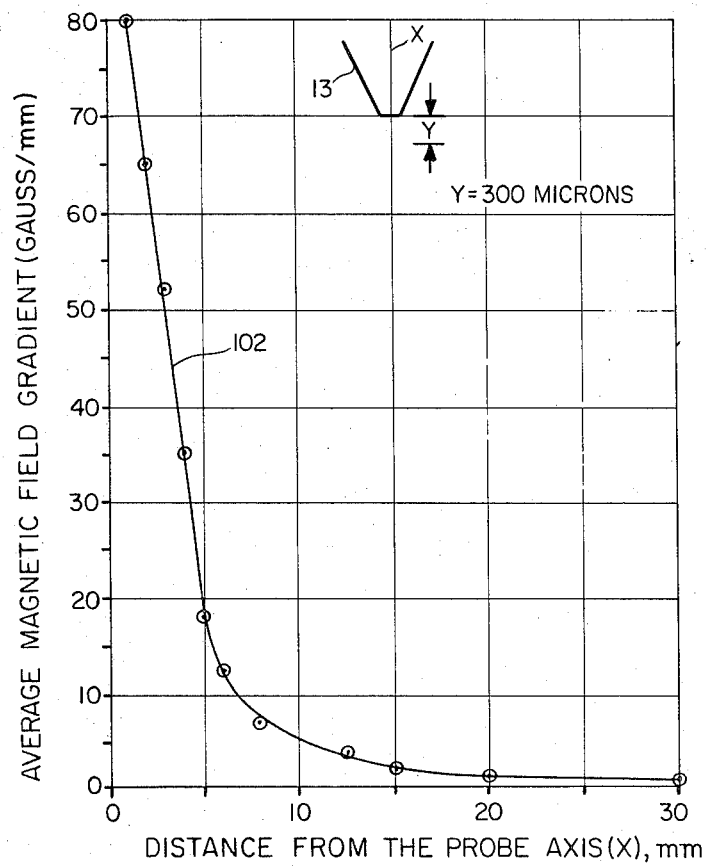
FIG. 10 is a curve showing the magnetic field gradient as a function of the distance from the probe axis of the force field generating apparatus.

Referring to FIG. 9, there is shown curves 100 and 101 illustrating the magnetic field intensity as a function of the device current. The lower curve 100 illustrates the magnetic field intensity at a distance Y = 380 microns below the tip of the probe 13 whereas the upper curve 101 illustrates the magnetic field intensity where the distance Y = 130 microns. FIG. 10 is a curve illustrating average magnetic field gradient as a function of the distance from the probe axis and it will be seen from the curve 102 the average magnetic field gradient at a distance Y = 300 microns below the tip of probe 13 dropped rapidly with displacement from the probe axis ($x$).

As pointed out above, the various types of treatment devices for producing the predetermined gradient force fields utilized in treatment of the plants are illustrated in FIGS. 1–8. The devices illustrated in FIGS. 1 and 2 both produce a magnetic field and for purposes of convenience will be referred to herein as type A treatments, i.e., 1A and 2A. The devices illustrated in FIGS. 3–6 all produce combined magnetic and electric fields and for purposes of convenience will be referred to herein as type B treatments, i.e. 3B, 4B, 5B, and 6B. The devices shown in FIGS. 7 and 8 produce electric fields and for purposes of convenience will be referred to as type C treatments, i.e. 7C and 8C. From the following examples to be discussed it will be seen that the effect of the above treatment combinations on a given plant species has been investigated as a function of the position of the treatment area on the plant embryo, the treatment duration and intensity, and the development stage of the organism. The results of these parametric studies are utilized in accordance with the present invention to determine the optimum treatment parameters, i.e. exposure, intensity, duration, location and length of radicle, on a given plant species to produce the desired growth effects.

In studying the growth responses as a function of treatment, the seeds aree germinated on wet toweling, and following treatment, are immediately planted in the soil. Untreated plant embryos (controls) are also planted at the same time. As soon as the plant appears through the soil, the data are recorded. Plant heights are recorded every few days, and after primary leaves appear, a measurement of "leaf expansion" is recorded. This measurement includes the total spread, or width of the plant. In addition, records are kept of the size and quantity of the fruits produced on these plants taken to maturity.

After a given period of development, a growth rate or plant height is determined for an entire series of plants (treated and controls). The growth values are determined on all the plants for the same given number of days for development. The percent change in growth $\Delta G$ is determined from the expression $$\Delta G = [(T_g - C_g)/C_g] (100)$$

where $T_g$ is the mean plant height (or growth rate) or a series of test plants and $C_g$ the mean height (or growth rate) of the control plants. The values of $\Delta G$ at positive percentages, represent growth rates greater than the control plants, and the values of $\Delta G$ at negative percentages represent growth rates less than the control plants. Inn the following tables for the various examples, the data given is the average value for the various groups of plants each comprising a plurality of plants.

In the following examples to be discussed in connection with dicotyledonous plants, the treatments have been directed to specific target zones along the embryonic radicle and hypocotyl. At the stage of germination at which these treatments were conducted, the cotyledons were still within the seed coat. Near the root tip is a region of slight coloration which extends for a distance of about 4–6mm. Within this meristematic zone, are quite distinct regions with varying degrees of hormone synthesis and mitotic activity. At the radicle tip, or just behind the root cap, is the region of apicle initials in which the cell division and DNA synthesis is at a very low level. At a position about 1 mm. from the root tip is a zone of maximum cell division activity and growth. Again moving acropetally to a point approximately 1.5 to 2 mm. from the root tip, locates a zone of rapid cell elongation, which again is a zone with a different type of developmental activity. At a region about 3–5 mm. from the root tip the differentiation of primary vascular tissue begins. Very rapid changes in cellular activity take place within the critical 5–6 mm. zone of the root tip. At a region about 1 cm. from the tip there is a zone containing primary tissue as well as the beginning of the differentiation of secondary growth characteristics.

It is to be understood that the foregoing dimensions are only approximate and will vary considerably for different species. For a more detailed disclosure of various plant zones reference may be had to the text *Plant Physiology* by F. B. Salisbury and C. Ross, Wadsworth Publishing Co., Inc., Belmont, Calif., (1969) and particularly Chapter 22, pp. 481–509.

EXAMPLE NO. 1 BUSH BEANS

TABLE I

Growth Variation with Intensity of Exposure in a Series of Bean Plants Treated 2 min. at the Root Tip (apicle initial) region

| Treatment | G Growth Change — % | |
|---|---|---|
| | High Intensity | Low Intensity |
| 1A | −29 (15 ma) | +31 (2 ma) |
| 2A | −26 (15 ma) | +25 (2 ma) |
| 3B | −26 (15 ma, 600 v) | −4 (2 ma, 150 v) |
| 4B | −11 (15 ma, 600 v) | 0 (2 ma, 150 v) |
| 5B | +8″(15 ma, 600 v) | +3 (2 ma, 150 v) |
| 6B | −24 (15 ma, 600 v) | +8 (2 ma, 150 v) |
| 7C | −26 (600 v) | +56 (150 v) |
| 8C | −5 (600 v) | +10 (150 v) |

In terms of exposure duration, the 2 minute treatment times provide somewhat more consistent growth data than the results from 30 min. exposures using the same target zone region. This is demonstrated in Table II, where 30 min., low intensity exposures are shown for two treatment locations.

TABLE II

Growth data showing variations in different treatment zones (30 min., low intensity H=2 ma, E=150 v)

| Treatment | ΔG Growth Changes — % | |
|---|---|---|
| | Radicle Tip | 1 cm from tip |
| 1A | −18 | +57 |
| 2A | +32 | +39 |
| 3B | +52 | +8 |
| 4B | +33 | +47 |
| 5B | −25 | +54 |
| 6B | +6 | +6 |
| 7C | +6 | −23 |
| 8C | −34 | +43 |

When radicle tip data are compared for positive and negative growth changes it is apparent that the growth effects in the 30 min. series are more variable than the 2 min. data for the series in Table II. The reason for this greater variation in the 30 min. treatment results may be accounted for as follows.

The target zone in the root tip region is very critical in terms of spatial positioning. Growth effects may change very drastically within a 0.5 – 1 mm linear distance. With longer time exposures, 30 min., the plant embryo may grow out of the target zone. Thus at the end of the exposure period a far different type of cellular tissue may be receiving the exposure than in the initial stages. In the case of the short time exposures, such as 2 min. data in Table I, the specific tissue region being exposed does not have the opportunity to grow out of the target zone. One would expect at a position 1 cm from the tip that the specific target zone would not be as critical a factor, and growth, therefore, would not influence the results to the same degree as exposures in the meristematic region. This is borne out by the data in Table II, with exposure at 1 cm from the radicle tip. Here again the low intensity treatment produces a positive growth effect and only in one case, the 7C treatment, was a negative response observed.

The 24 hour exposure treatments on germinating seeds are conducted in a somewhat different manner than the treatments discussed above. Here the seed is placed on wet toweling and wrapped in a plastic-film envelope to prevent the toweling from drying out. One layer of film covers the seed. The seed is immediately exposed after it is placed in the wet toweling and left in the envelope for a 24 hour period or longer. Control seeds are also placed in the wet toweling-plastic envelopes, but do not receive the exposure. Although the 24 hour exposure results have been as inconsistent as the 30 min. exposures, in general, negative growth responses have been observed. Again, the variation in these results can be explained by the movement of the seed during the initial germination period caused by the swelling of the seed coat and the initiation of growth processes in the embryo.

Second generation transfer effects were also examined in the 24 hr. treated series. For example, in the $F_1$ generation the treatment of dry seeds as well as seeds in the initial stages of germination disclosed reduced vegetative growth. In some of these series pod induction was reduced and in others it was enhanced. In the second generation plants there were indications that the fruiting characteristics were dependent on whether the seed was treated in the dry state or during the initial stages of germination. The data in Table III show that in both the case of the dry seed and initial germination the growth rate is retarded over twenty percent relative to the controls.

Table III

Second Generation Results from Greenhouse Series — Dry Seed vs. Initial Germ (24 hr. Exposures — 8C, E=600 v. Endosperm Region)

| Conditions | Growth ΔG% | pods/plant % of Control | mature pods % of Control |
|---|---|---|---|
| initial germination | −22.0 | +34.2 | +21.2 |
| dry seed | −26.6 | −8.2 | −13.4 |

In comparing the fruit induction, however, the situation is considerably different in the series treated in the stage of initial germination, both the number of pods per plant and the mature pods are considerably enhanced relative to the controls. The data in Table III again show that the degree of metabolic activity is of considerable importance when considering the production of growth variations and their transfer to successive generations of plants.

Dry seed treatment in the first generation produced enhanced development of the plant, as shown in Table IV for series with various treatments in the hypocotyl region of the seed.

TABLE IV

Initial Pod Induction in $F_1$ Bean Plants from Dry Seed treatment — 50 days Growth (24–42 hr. exposure, low intensity, H=2 ma, E=120 v. hypocotyl region)

| Treatment | growth ΔG% | avg. pods per plant | avg. pod length | N-plants |
|---|---|---|---|---|
| 1A | +25.4 | 3.16 | 3.2 | 6 |
| 2A | +12.7 | 2.00 | 4.2 | 3 |
| 3B | +31.0 | 2.00 | 5.1 | 5 |
| 7C | +14.3 | 2.25 | 5.0 | 4 |
| Controls | — | 1.67 | 4.5 | 9 |

Two very significant growth increases are shown in Table IV and in addition; the greater number of pods per plant also suggests enhanced development.

A study was made to examine the stage of development at which the treatment method is expressed. To examine this developmental question after plants had grown to the fifth or sixth nodal stage, detailed measurements were made of each internode of all of the plants within a given treatment series. Thus, the rate of development could be examined along the plan stem. The results showed almost identical internode lengths for the first internode, and this probably explains why differences do not show up until at least two to three weeks of development. In the treated plants, the most apparent increase in growth was noted in the third and fourth internodes. By the same token, plants demonstrating a growth retardation also manifest the effect in the later internodes. From this it may be concluded that both positive and negative growth responses are not manifested until the later stages of development.

A group of four plants were selected from a given treatment series regarded as being typical of both the accelerated and retarded growth effects. These plants yielded seed and the seed data as well as the number of days for initial seed harvest are presented in Table V.

TABLE V

Seed Harvest data from plants selected at an early stage of development as being typical of the growth effects (2 min. 3 mm from tip, high intensity H=10 ma, E=600 v.)

| Treatment | Growth Effect | Initial seed harvest-days | seed/plant | 2 wk. growth rate (cm/day) |
|---|---|---|---|---|
| 4B | "accelerated" | 67 | 18 | 1.83 |
| 2A | "intermediate" 78 | 78 | 11 | 1.87 |
| 7C | "retarded" | 77 | 15 | 1.15 |
| Control | "typical" | 82 | 11 | 1.72 |

It is interesting to note in Table V that a retarded growth rate is not necessarily related to the number of days for initial seed harvest. The 7C plant, for example, disclosed a seed maturity time less than the control even though the growth rate was considerably reduced. In general, it may be said from the initial seed harvest data, that a higher yield of seeds as well as a shorter development time is obtained from certain treatment types. In those series nearest the completion of seed harvest, the treatment type producing the shortest seed harvest time also yields a greater number of seeds. In Table VI, these data are listed for several series, along with the control values. The intensity of the treatments ranged from H = 2 to 12 ma. and E = 300 to 600 v., at 3 mm and 1 cm. locations on the radical and for durations of 2 – 30 min.

TABLE VI

Preliminary data comparing partial seed harvest in treated groups with minimum development times to maturity

| Days to Initial Harvest | | Seeds/plant | | Treatment Type |
|---|---|---|---|---|
| Controls | Treated | Controls | Treated | |
| 100 | 93 | 7 | 8.5 | 5B |
| 101 | 89 | 7.3 | 8.6 | 6B |
| 92 | 86 | 8 | 10 | 5B |
| 92 | 76 | 9.2 | 18 | 4B |
| 92 | 82 | 6 | 6.5 | 1A |

On a selected date fruiting data were taken from a large number of bean plants exposed at various locations, durations, and intensities. These data were all compared in terms of the pods per plant for each treatment type. These data incorporate all plants including 24 hour exposures which, in the majority of cases, produced dileterious effects in terms of growth rates and fruiting. If these retarded plants had no seed pods or flowers they were still counted in the data as having zero fruiting. The data in Table VII therefore represents the bean pod development at one time point in the life cycle.

TABLE VII

Bean data taken on a selected data for all plants and averaged according to treatment type. (Exposure=2 min. to 2 hrs., location from radical tip to 1 cm. from tip, H=2 to 14 ma., E=300 to 600 v.)

| Treatment | pods per plant | Alternation percent | N plants |
|---|---|---|---|
| 7C | 3.75 | +70.5 | 16 |
| 1A | 3.53 | +60.4 | 32 |
| 5B | 3.50 | +59.1 | 12 |
| 2A | 3.32 | +50.9 | 25 |
| 3B | 3.23 | +46.8 | 13 |
| 4B | 3.00 | +36.3 | 10 |
| 8C | 2.95 | +34.0 | 20 |
| 6B | 2.74 | +24.9 | 15 |
| Control | 2.20 | — | 40 |

It is interesting to note that all treatment types disclose a greater number of pods per plant than the control group. The 8C treatment in general very markedly retards growth; however, as shown, the number of pods per plant still lies above the control level. This demonstrates that there is not a one to one relationship between the development of the fruit and the growth rate responses, and that morphological changes can be achieved without delaying maturity.

Detailed studies concerning a "zoning" effect will be discussed in connection with FIG. 11. A staining procedure is used to locate zones or target regions along the developing radicle and the results obtained through the application of this method are very pertinent in terms of understanding growth and development differences.

The staining procedure consists of germinating the beans to the stage preparatory to the aforesaid treatment method and then subjecting them to a cytological stain, tetrazolium red. This stain is selective to those tissue regions which have very high dehydrogenase activity. These enzymes are very critical in the initiation of electron transport during respiration and oxidative phoshorylation particularly in the cytochrome system. The presence of high dehydrogenase activity may or may not correspond to regions of high mitotic activity along the developing radicle. In the initial studies with the cascade beans it was noted that there were very definite zones of coloration or dehydrogenase activity along the developing radicle and furthermore, that these zones changed somewhat in position and intensity as growth proceeded. In the early stages of development essentially two color zones were seen. One, a very dark stained region, approximately 3 mm from the root tip, and a lighter pinkish colored zone extending beyond this several centimeters from the root tip.

When comparing these initial staining results with data involving treatments at various positions along the radicle, there were indications that treatment in the zones of heavy staining reduced the vegetative growth and development of the plant. A series of treatments in which the exposures were done at specific locations with regard to these various stained regions, along the root radicle were designed in order to check these results. For this purpose a series of cascade beans each with a different radicle length, were treated for 5 min. using a low intensity exposure (2.5 ma.) of the 1A type. The locations along the radicle were chosen so that the exposures were either located within or clearly outside the dark stained region.

Figure 11:
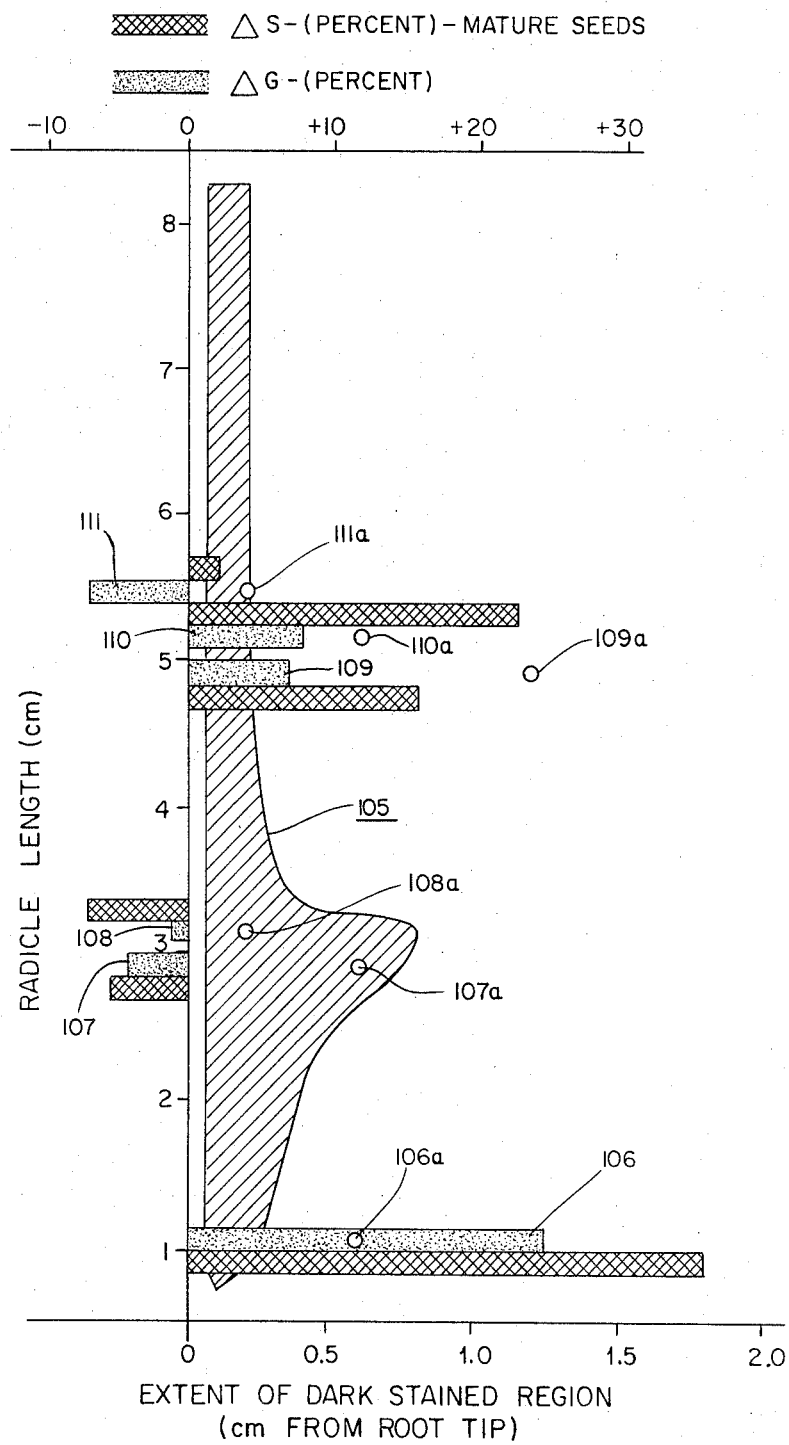
FIG. 11 is a composite graph showing the relative changes in growth and seed production as a function of radicle length and treatment position relative to the zone of dehydrogenase activity in bush beans.

The results of this study are summarized in FIG. 11 which presents both the growth data as well as the zone of dark staining as a function of radicle length. The dark red zone of high dehydrogenase activity is shown in this figure by the zone or area 105. This zone shows the greatest extension at a radicle length of 3 cm. With radicles of greater length, it becomes narrower in extent. The growth and seed harvest results expressed as fractional variations from the control series are summarized by the stippled and cross-hatched horizontal bars 106–111. The values of the growth and seed harvest alteration are given along the top of FIG. 11. The circles 106a – 111a located either within or in line with the stippled horizontal bars 106–111 indicate the position on the radicle at which the treatment was applied. With the growth bar 106 at 1 cm. radicle length, for example, the circle 106a is located at 0.6 cm. and is clearly out of the dark stained region 105. It should be noted that all of the bars 106, 109 and 110 showing positive growth effects, were treated outside the dark stained region 105. On the other hand, the bars 107, 108 and 111 showing negative growth results, were treated within the dark strained region or zone 105 of high dehydrogenase activity.

Second generation plants were examined and it was found that the transfer of effects was essentially dependent on the position of the treatment with respect to the dehydrogenase zone. In Table VIII for example, are two series of plants, along with the controls, both of which showed enhanced growth in the first generation.

TABLE VIII

Fruit and growth analysis from $F_2$ bean plants in greenhouse (data taken at 54 days growth). H=2 ma. E=300 v.

| Treatment | Growth ΔG % | Pods/Plant | Mature pods* per plant | N-plants |
|---|---|---|---|---|
| 1A (2 min. tip low) | +28.5 | 19.8 | 8.6 | 5 |
| 4A & 4B (2 hr. tip low) | +15.3 | 19.5 | 8.2 | 4 |
| Controls | — | 14.6 | 6.6 | 7 |

*This number represents the average number of pods per plant greater than 10 cm. in length.

Growth is shown to be transferred to the second generation along with increased pod induction and more mature pods at this particular stage of development. In both of the treated series the exposure was at the root tip zone, and reference to FIG. 11 shows that the dark stained region 105 does not start until approximately 0.5 mm from the root tip. The exposures in Table VIII would therefore, have been made out of the active dehydrogenase zone. A summary of the fruiting data from other $F_2$ plants is presented in Table IX and again it is shown that the enhanced maturity effects are essentially transferred from the first generation.

TABLE IX

Summary of $F_2$ Bean Fruiting in Field Test Plants (data taken after 77 days growth). Same treatment ranges as Table VI.

| Treatment | pods per plant | mature pods/plant* | N-plants |
|---|---|---|---|
| 1A | 14.6 | 8.0 | 5 |
| 2A | 21.0 | 11.0 | 4 |
| Combined B's | 23.3 | 11.7 | 10 |
| 7C | 22.4 | 11.7 | 9 |
| 8C | 25.8 | 13.3 | 6 |
| Controls | 16.7 | 8.2 | 16 |

* This number represents the average number of pods per plant greater than 10 cm. in length.

TABLE IXA

Field data from $F_2$ Bush Beans showing reduced vegetative growth in the $F_1$ generation a 10–20 percent decrease in growth was induced (as requested) by the treatment types using 2 min. exposures at the root tips and H=14 milliamps E=600 volts

| Treatment | Average plant height | pods per plant | ΔG in $F_2$ | N-Plants |
|---|---|---|---|---|
| 1A | 44.7 cm | 8.8 | −12.0% | 100 |
| 3B | 40.4 | 7.8 | −21.1% | 100 |
| Controls | 51.2 | 8.2 | — | 100 |

Figure 12:
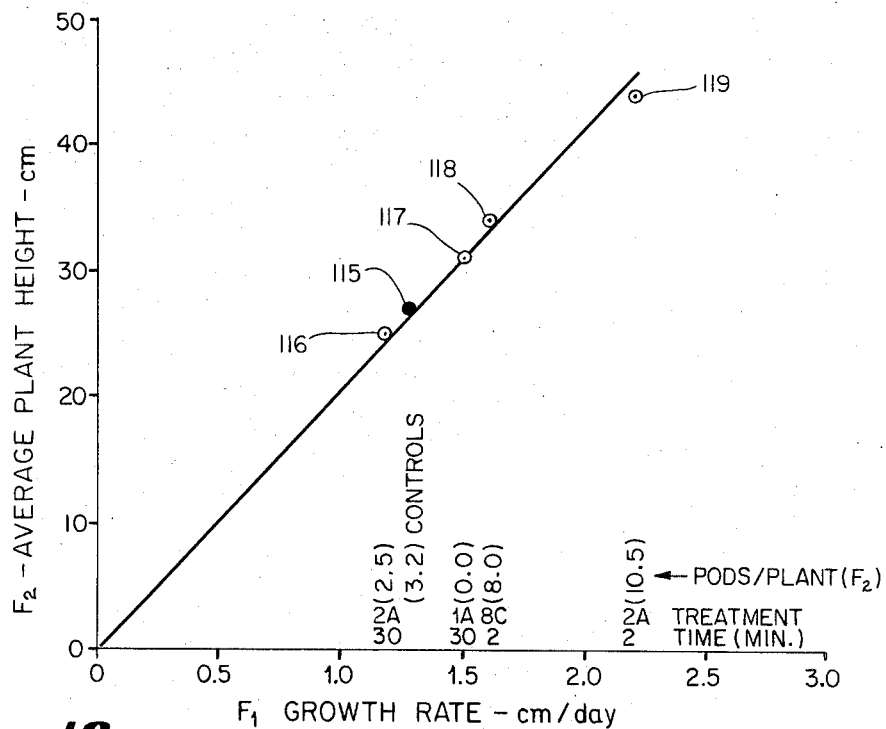
FIG. 12 is a curve showing transfer of growth and podding into the second generation of bush bean plants.

Referring to FIG. 12 there is illustrated a graph showing transfer of growth and podding into the second generation $F_2$ bush bean plants. Each of the reference characters 115–119 represent groups of bush bean plants. The plants in group 115 were untreated i.e. controls. The 116 group of plants had a 2A treatment at a low intensity of H = 2 milliamps for 30 minutes. As seen from FIG. 12 the plants in group 116 had a shorter average plant height than the controls in group 115 and also produced fewer pods per plant. The plants in group 117 received a 1A treatment at the same low intensity as group 116 and for a period of 30 minutes. While the average plant height in group 117 was greater than that of the plants in the control group 115 it will be noted that they had not at this stage of development produced any pods. The plants in group 118 received an 8C treatment at a low intensity of E = 150 volts for a period of 2 minutes. The plants in group 119 received a 2A treatment at a low intensity of H = 2 milliamps for a period of 2 minutes. It will be seen that the plants in groups 118 and 119 both had an average plant height substantially greater than the control group 115 and also at a substantially higher number of pods per plant. All of the plants treated in group 116–119 were treated at the root tip.

It was also found that the alterations were carried over into the third generation $F_3$ in the bush bean plants. The following Table X shows the growth in the $F_3$ bush beans at 38 days and also the pods per plant at 75 days. The pod data at 75 days demonstrate early maturation in the two treated series.

TABLE X $F_3$ — Bush Beans

| Treatment | Growth at 38 days ht. cm. | ΔG | Pods per Plant at 75 days | N-plants |
|---|---|---|---|---|
| 1A (2 hrs., root tip- H=2 ma.) | 25.8 | +31.0% | 5.5 | 6 |
| 1A (2 min., root tip- H=2 ma.) | 22.1 | +12.2% | 3.9 | 16 |
| Controls | 19.7 | — | 1.0 | 12 |

EXAMPLE No. 2 — TOMATO PLANTS

The various treatments were also applied to tomato plants. The tomato growth data set forth in the following Table XI are for a series of groups of plants (four to eight plants per group) treated at low intensity (H = 2 milliamps, E = 150 volts) for a 2 minute period at the root tip.

TABLE XI

| Treatment | Growth Alteration ΔG (percent) |
|---|---|
| 1A | +17.8 |
| 2A | +44.5 |
| 3B | +15.0 |
| 4B | +8.9 |
| 5B | +9.8 |
| 6B | +23.8 |
| 7C | +54.2 |
| 8C | 0.0 |

In Table XII are listed growth rates for treated and control series determined in the $F_1$ and $F_2$ generations.

TABLE XII

First and second generation effects in treated and control tomato plants (5 plants per group)

| Growth response | $F_1$ growth rate (cm/day) | $F_2$ growth rate (cm/day) |
|---|---|---|
| acceleration | 0.48 | 0.58 |
| controls | 0.45 | 0.49 |
| retardation | 0.15 | 0.42 |

In both the $F_1$ and $F_2$ data the control plants give average growth rates lower than the accelerated series and higher than the retarded plants.

As previously discussed a relationship was found between growth rate and length of the emerging embryonic radicle. The same relationship was found in treated tomatoes. The short radicle lengths at the very early stages of development are more sensitive to the treatment methods in terms of producing increased growth rate than are later stages with a longer radicle length. In studying the radicle length effect in relation to the treatment parameters, the tetrazolium red staining procedure was applied before conducting the treatments on the developing embryos. The staining studies disclosed a very intense band of red stain, or high dehydrogenase activity, which was most clearly defined in radicles between 4 and 6 mm in length. This zone was located at 0.6–0.8 mm from the root tip. As the radicles increased in length from 10 to 15 mm this dark band became less defined and the dehydrogenase activity was less localized along the radicle.

Figure 13:
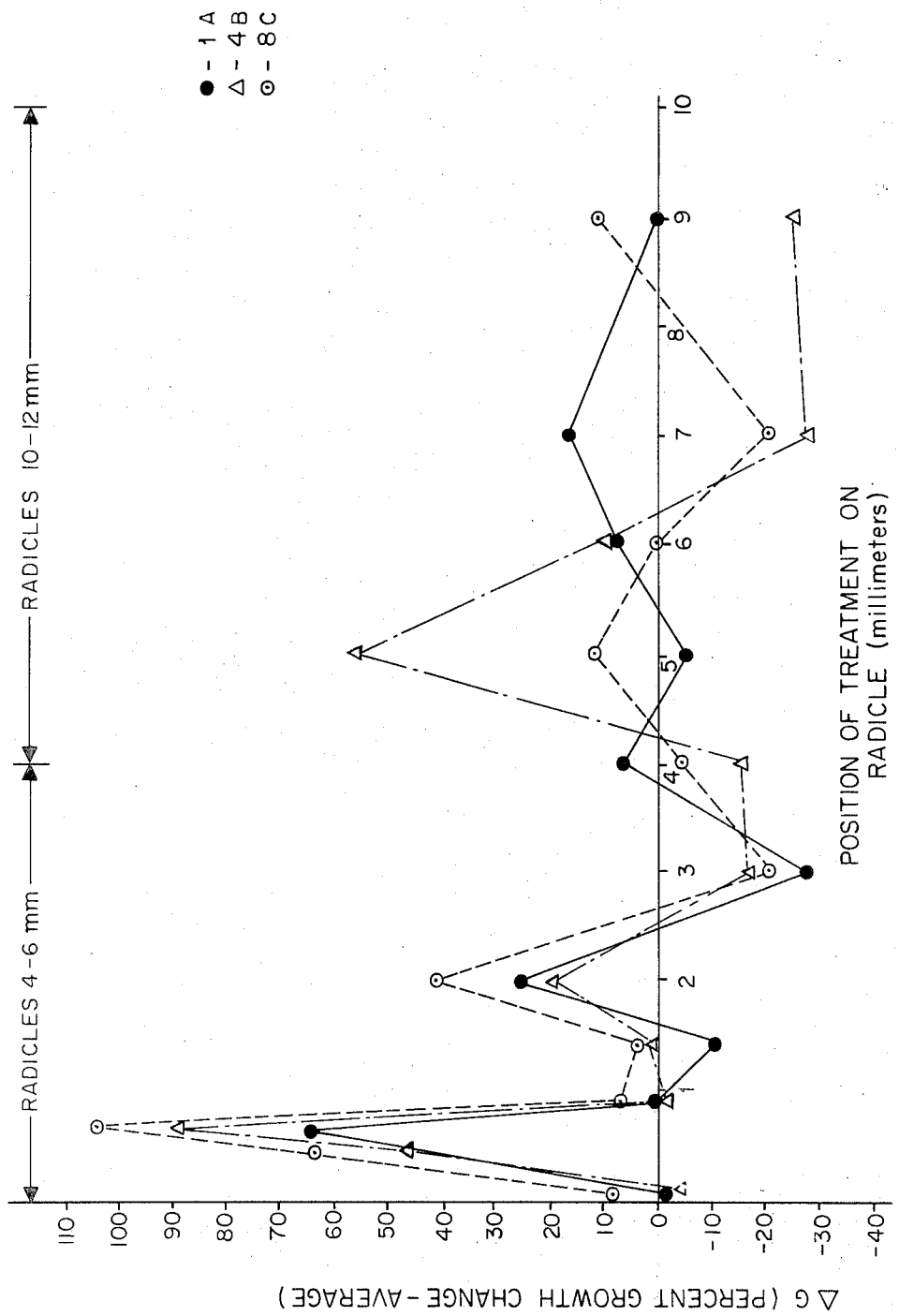
FIG. 13 shows a group of curves illustrating the percent change in growth in tomato plants as a result of treating along the radicle.

To closely examine the influence of these patterns, plants were treated using three types of exposures (time = 5 min., H = 5 ma., E = 300 v.) and two defined radicle length stages. The treatments were started at the root tip and the treatment zones were fairly close together for the first three or four mm along the radicle. These growth data expressed as percent of the controls, are shown in FIG. 13 which summarized the results from approximately 220 plants. First of all, it is noted in this figure that a very pronounced growth peak occurs at around 0.6 mm from the root tip. The growth increase zone corresponds precisely with the active dehydrogenase staining region. On the surface, this appears to present a very paradoxical situation, since in the case of the bean plants pronounced retarded growth was found when treatments were conducted in the dark stained region. In the tomato plants, we have just the opposite situation; however, the pronounced difference in the response between these two species of plants, may be related to the relative positions of the mitotic activity and the tissues with high respiratory metabolism. In the one case, in the tomatoes, for example, the two zones may coincide, whereas in the case of the beans, they may be spatially separated along the radicle.

There are several other features of considerable interest in FIG. 13, for example, in the treatments extending up to 4 mm on the radicle, which is in the series of plants with radicles 4 to 6 mm in length, the effects of the three treatments used, parallel one another, that is peaks and valleys occur at the same location with all three treatment types. It is also noted that using the plants with longer radicles (10–12 mm) the close variation between the three treatment types is completely absent. Here it is seen that they are not only out of phase, but that in most cases, the treatments either produce very little growth enhancement, or a negative growth. This clearly shows the importance of treating the plants at a specific development stage as well as at a precise location on the radicle.

Figure 14:
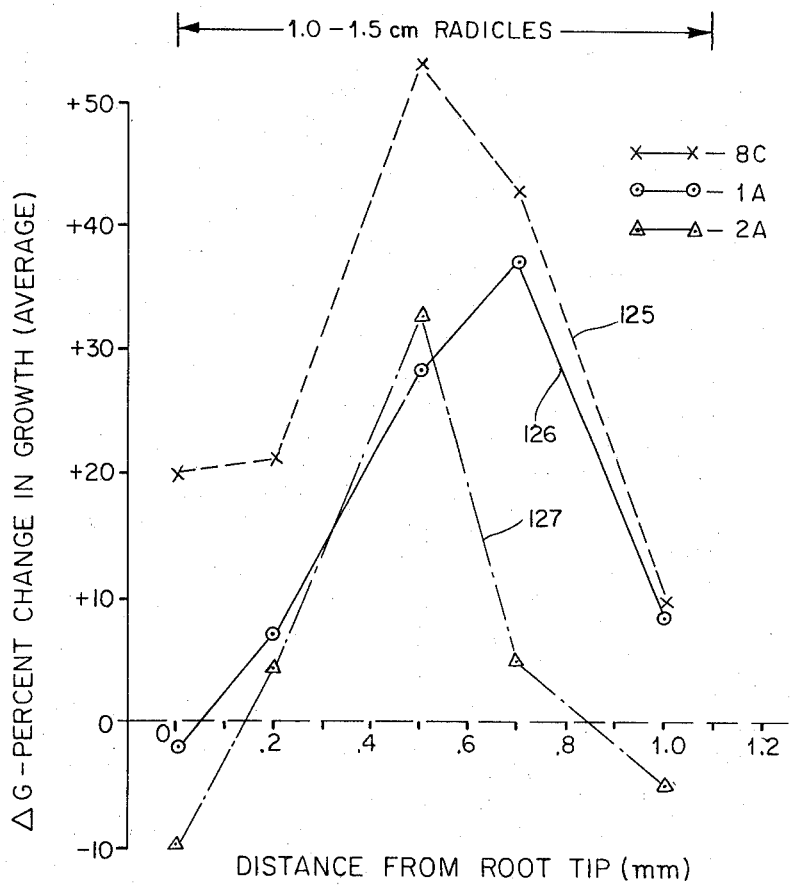
FIG. 14 shows a group of curves similar to FIG. 13 but for longer radicles of tomatoes.

Referring to FIG. 14 there is illustrated a second series of curves showing the effect of treatment location on growth in tomato plants. The plants treated in this series had radicles of 1.0 – 1.5 cm. The plants used in curve 125 received an 8C treatment. The plants used in curve 126 received a 1A treatment and the plants used in curve 127 received a type 2A treatment. All treatments were for a period of 5 minutes and at medium intensity (H = 5 ma. E = 300 v). All three of the curves 125–127 in FIG. 14 are based on 43 days growth. It should be noted that these curves duplicate very closely that portion of the curves in FIG. 13 which lie between 0 – 1 mm. radicle length.

Figure 15:
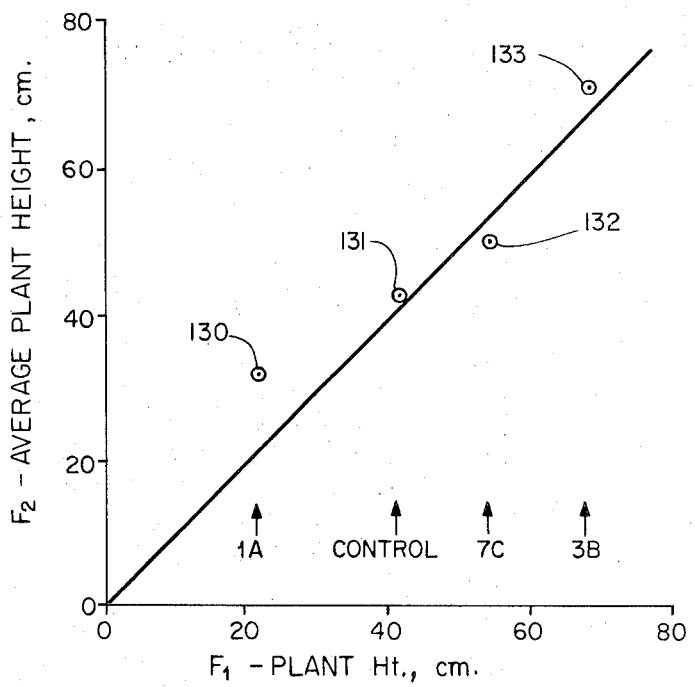
FIG. 15 is a curve showing transfer of treatment effect into second generation of tomatoes.

It was also found that the first generation $F_1$ growth effects were transferred to the second generation $F_2$ of tomato plants. This is clearly illustrated in FIG. 15 where the data points 130–133 are located along the theoretically expected line drawn in this figure. Each point 130–133 represents a group of plants with group 131 being the control and the treatment types of groups 130, 132 and 133 being indicated along the bottom of the figure. In the first generation $F_1$ all of the plants in groups 130, 132 and 133 were treated for 24 hours during the initial stages of germination. The intensity of the treatments was H = 3.5 milliamps, E = 600 volts. It will be noted that the plants in groups 132 and 133 showed a plant height in both the $F_1$ and $F_2$ generations greater than the controls while the plants in group 130 showed a decreased growth.

The next points of interest concerning these second generation $F_2$ tomato plants pertained to the enhanced fruiting as related to growth variations within each series. Data concerning both of these points are summarized in FIG. 16 where actual growth curves are presented for four groups of second generation plants (1A, 7A and two control series). At the 50 days growth point, the standard error bars (S.E.) indicate a very significant difference between the various series. In the case of the control plants, the two different control groups are almost identical in their growth patterns. Although these control groups were from the same variety of plant, they were taken from $F_1$ series grown at different times, therefore, they were not subjected to the same environment cycles throughout their development. In spite of this however, the controls show very uniform and consistent growth patterns. At 71 days, under the greenhouse conditions, the control plants as shown were just beginning to fruit, and those fruit present were less than 1 cm. in diameter. In both the 7C and 1A plant groups, the fruit setting was far more advanced as shown by the values for fruits per plant in FIG. 16. It is interesting to note, that the 1A treatment, even though disclosing a reduced vegetative growth, also disclosed a more enhanced fruit development. In the treated plants fruit over 4 cm. in diameter were present.

Figure 16:
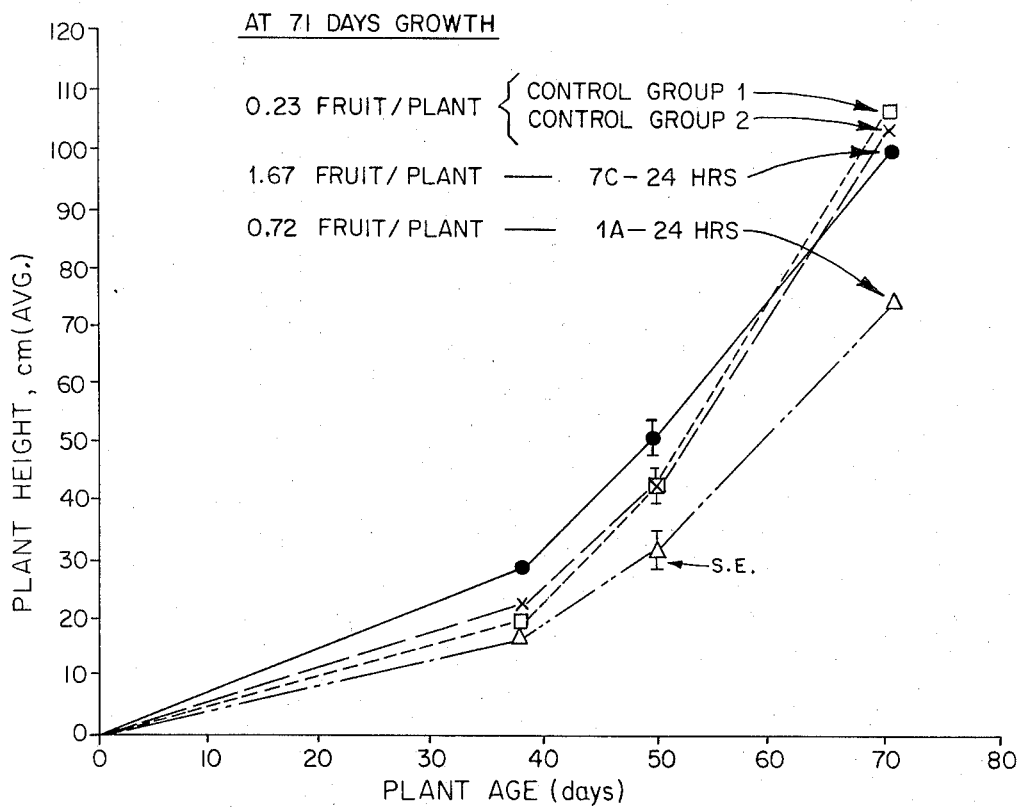
FIG. 16 is a family or curves showing the growth and fruiting in second generation tomatoes.

Another interesting aspect of the FIG. 16 growth curves, is the crossing over of the control curves giving a higher plant height at the final stages of development (at the 71 day growth point). Although the 7C plants disclosed a high growth rate in the initial stages of development the fruit setting occurred at an earlier stage, and this, of course, greatly reduced vegetative growth. The controls, on the other hand, since they were delayed in fruit setting, continued to grow and their final vegetative growth exceeded that of the 7C plants.

EXAMPLE NO. 3 CUCUMBER

Growth characteristics at 35 days development together with fruiting data taken after 55 days development are presented in Table XIII.

TABLE XIII

Growth and fruiting in Cucumber (2 min., root tip, high intensity H=12 ma. E=600 v., 0.5–1.0 cm. radicle)

| Treatment | Growth—35 days ΔG-percent | Fruiting—55 days | | N-plants |
|---|---|---|---|---|
| | | fruit/plant | max. fruit lgth. | |
| 1A | +32.6 | 1.0 | 10 cm | 4 |
| 2A | +55.1 | 1.6 | 13 | 5 |
| 3B | +68.5 | 2.6 | 17 | 5 |
| 4B | +46.0 | 3.6 | 13 | 5 |
| 5B | +39.4 | 2.0 | 10 | 5 |
| 6B | +61.8 | 2.2 | 12 | 5 |

TABLE XIII -Continued

Growth and fruiting in Cucumber (2 min., root tip, high intensity H=12 ma. E=600 v., 0.5–1.0 cm. radicle)

| Treatment | Growth—35 days ΔG-percent | Fruiting—55 days fruit/plant | max. fruit lgth. | N-plants |
|---|---|---|---|---|
| 7C | −12.4 | 0.8 | 9 | 5 |
| 8C | −30.3 | 0.6 | 5 | 5 |
| Control | — | 1.1 | 9 | 7 |

Both the growth and fruiting characteristics are much higher in the B type exposures. Concerning the 4B treatment it is interesting to note that although the fruiting was increased by more than a factor of three this treatment did not disclose the greatest growth enhancement. All of the B treatments disclosed from 2 to 3 times the amount of fruit per plant compared with the control series. The maximum fruit size is also at the highest level in these treatment types.

EXAMPLE NO. 4 BROCCOLI

The object here was to produce a more sturdy plant (larger stem size). In the case of the 1A treatment (Table XIV) this was accomplished and in addition an indicated increase in head development. In the 8C exposure head development appears to be retarded and this is in agreement (qualitatively) with the influence of this treatment type on other plant species.

TABLE XIV

Data taken at 90 days-greenhouse (2 min., H=2 ma., E=120 v.)

| Treatment | Ave. stem diameter-cm | Ave. head diameter-cm | N-plants |
|---|---|---|---|
| 1A | 2.1 | 1.6 | 5 |
| 2A | 1.7 | 1.2 | 4 |
| 3B | 1.8 | 1.2 | 5 |
| 4B | 1.8 | 0.7 | 5 |
| 5B | 1.8 | 1.3 | 5 |
| 6B | 1.7 | 2.2 | 5 |
| 7C | 2.0 | 0.9 | 5 |
| 8C | 1.8 | 0.0 | 5 |
| Control | 1.7 | 1.4 | 7 |

EXAMPLE NO. 5 SOY BEANS

Two series of soybeans consisting of about forty plants in each were developed under field conditions. In one series, exposed for 2 minutes at the root tip using a medium intensity, both the plant growth and pod development were retarded in every treatment type compared with the control series. In a second series, also treated at 2 minutes, but at approximately 0.7mm from the root tip and at low intensity quite the opposite situation was noted. In this case the growth was enhanced slightly in the A type treatments, however the podding was considerably increased as shown in Table XV where the treatment types have been combined because of the limited number of plants within each treatment kind.

TABLE XV

Growth and Pod development in Soybeans (field series-data taken after 88 days; 2 min. 0.7 mm from root tip, low intensity, H=2 ma. E=120 volts combined treatment types)

| Treatments (combined) | avg. plant height | pods per plant | N-plants |
|---|---|---|---|
| A type | 73.3 | 39.3 | 15 |
| B type | 66.3 | 28.9 | 8 |
| C type | 63.5 | 30.6 | 5 |
| Controls | 67.8 | 29.0 | 7 |

In the case of the A treatments, approximately a 30 percent increase is noted in the pod development, whereas the vegetative growth discloses only approximately an 8 percent increase compared with the control series. In both the B and C type treatments, the growth and pod development remains at about the control levels.

As the plants in Table XV approached maturity it was apparent that certain treatment combinations (A-type exposures) enhanced development even though the growth rate was only slightly increased. At the actual seed harvest it was also found that the plants with the pronounced pod development also produced higher yields of seeds. An examination was made of the weights of these seeds to determine if the number of seeds increased at the expense of the weight or density of the fruit. To examine this possibility it was found convenient to use groups of thirty seeds in the weighings. These 30 seeds were selected at random from the groups of treated plants and controls. In this random selection those seeds which were dark colored and deteriorating were discarded and not utilized in the analysis. These data are summarized in the following table.

TABLE XVI

SOY BEAN SEED ANALYSIS

| Treatment | Ave. No. of seeds per plant | Ave. weight (per 30 seeds), gms. | N-plants |
|---|---|---|---|
| 1A | 152.2 | 6.40 | 8 |
| 2A | 302.0 | 6.88 | 6 |
| Control | 119.0 | 5.81 | 7 |
| B-combined | 111.2 | 5.80 | 8 |
| C-combined | 137.0 | 5.19 | 6 |

It is interesting to note that in both the 1A and 2A treatments the number of seeds per plant as well as the seed weights are higher than the control plants. In the case of the 2A treatment group this increase is very significant and the seed weight is over 18 percent higher than for the controls. In the case of the combined B and C treatments the data are not significantly different from the control plants.

EXAMPLE NO 6 WHEAT

In a preliminary treatment of wheat the exposures were at one location, the coleoptile tip, at 2 minutes duration and high intensity. The growth data taken after fourteen days development showed substantial changes in the growth alterations with the treatment combinations. To further explore the effect of the treatment at other positions on the developing plant a study was made of wheat growth as a function of treatment position on the radicle. The results of such study are illustrated by the curves in FIGS. 17 and 18.

Figure 17:
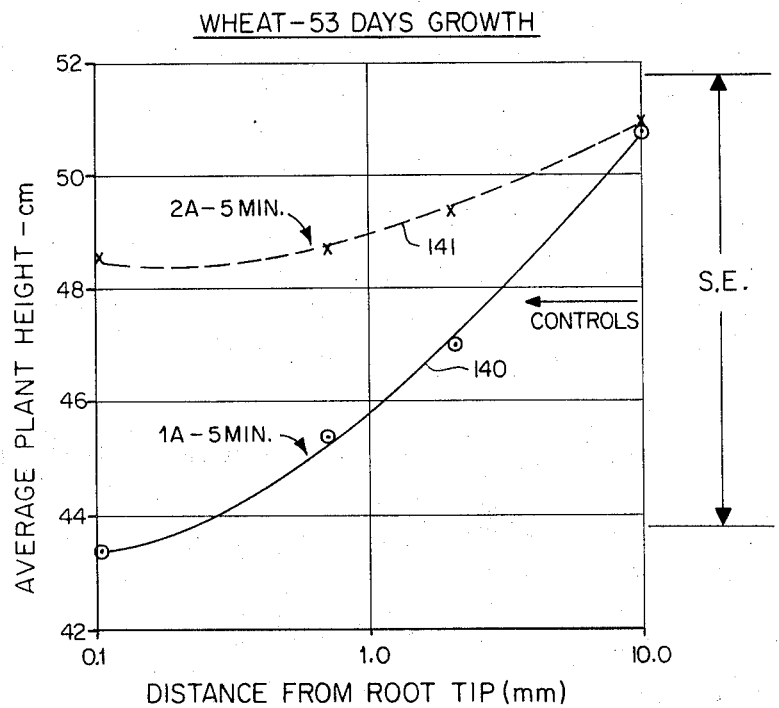
FIGS. 17 and 18 are a family of curves showing wheat growth as a function of treatment position on the radicle.

In FIG. 17 the curve 140 illustrates the effect on wheat growth as a result of 1A treatments on the radicle at distances from the root tip of 0.1 mm to 10.0 mm. The curve 141 illustrates the effect on wheat growth as a result of 2A treatments at corresponding locations on the radicle. The exposures were of five minutes duration and an intensity H of 4 milliamps. The data are based on 10 plants per point and at 53 days growth. Each point on the curves represents the center of a standard error bar (S.E.) of about the same span as that illustrated for the controls.

Figure 18:
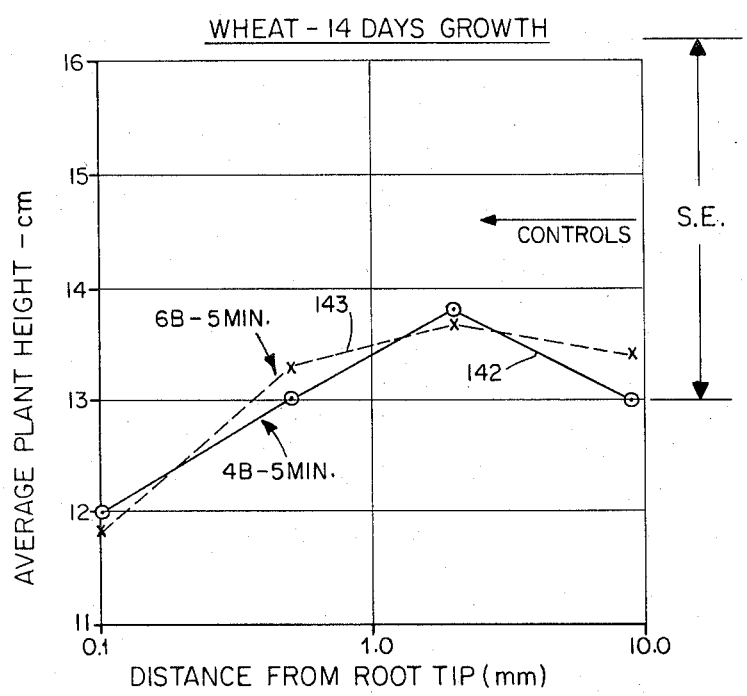

In FIG. 18 the curve 142 illustrates the effect on wheat growth as a result of 4B treatments on the radicle at distances from the root tip of 0.1 mm to 10.0 mm. The curve 143 illustrates the effect on wheat growth as a result of 6B treatments at corresponding locations on the radicle. The exposures were for five minutes duration and an intensity of H = 4 milliamps, E = 450 volts. The data are based on ten plants per point and at 14 days growth. Each point on the curves represents the center of a standard error bar (S.E.) of about the same span as that illustrated for the controls. As will be seen in FIG. 18 the treatments 4B and 6B both produced a decrease in growth as compared to the controls whereas the 1A and 2A treatments in FIG. 17 in general produced an increase in growth.

EXAMPLE NO. 7 ALFALFA

The following Table XVII sets forth the data on the growth and foliage variations in treated alfalfa.

TABLE XVII

Growth and foliage variations in treated alfalfa (5 min. — 2 milliamps intensity 0.25 mm from radicle tip)

| Treatment | Growth at 29 days (ht. and std. dev.) | Foliage at 56 days (Petioles and std. dev.) | N-plants |
|---|---|---|---|
| 1A | 8.13±1.70 cm | 10.28±2.53 | 19 |
| Controls | 6.18±2.79 cm | 7.20±3.38 | 36 |

To obtain the actual number of leaflets on the plant the petiole number should be multiplied by three (three leaflets per petiole).

EXAMPLE NO. 8 CARNATIONS

TABLE XVIII

Flowering Data $F_1$ Generation for Carnations (exposed 0.75 mm. from radicle tip)

| Exposure Type | Treated Series Days to Flower | Controls (No Exposure) Days to Flower |
|---|---|---|
| 1A-10 min.-10 ma | 81 | 109 |
| Do. | 88 | 100 |
| 1A-10 min.-2 ma | 88 | 109 |
| Do. | 84 | 102 |
| 1A- 2 min.-2 ma | 109 | 121 |
| Do. | 96 | 97 |
| 3B-10 min.-2 ma, 150v. | 100 | 112 |
| Do. | 100 | |
| 3B-10 min.-10 ma, 600v. | 115 | |
| Do. | 90 | |
| 7C-10 min.-10 ma, 600v. | 96 | |
| Average | 95.2 days | 107.1 days |
| Min. time to flower | 81.0 days | 97.0 days |

EXAMPLE NO. 9 SNAPDRAGON

TABLE XIX

Flowering Data $F_1$ Generation for Snapdragons (exposed 0.5 mm. from radicle tip)

| Exposure Type | Treated Series Days to Flower | Controls (No Exposure) Days to Flower |
|---|---|---|
| 1A-10 min.-10 ma | 72 | 93 |
| Do. | 84 | 97 |
| 1A-10 min.-2 ma | 77 | 87 |
| Do. | 93 | 84 |
| 3B-10 min.-2 ma, 150v. | 70 | 90 |
| 3B-10 min.-10 ma, 600v. | 83 | |
| Do. | 86 | |

TABLE XIX -Continued

Flowering Data $F_1$ Generation for Snapdragons (exposed 0.5 mm. from radicle tip)

| Exposure Type | Treated Series Days to Flower | Controls (No Exposure) Days to Flower |
|---|---|---|
| 7C-10 min.-10 ma,600v. | 80 | |
| Do. | 77 | |
| 7C-10 min.-2 ma, 150v. | 78 | |
| Average | 80.0 days | 90.2 days |
| Minimum time to flower | 70.0 days | 84.0 days |

EXAMPLE NO. 10 MARIGOLD

TABLE XX

The following data shows increased flowering in 1A treatments (exposed 10 min. in apical meristem region after emergence from seed coat (intensities range from H=1.0 to 12.0 ma., E=600 v.)

| Treatment | Flowers per plant | Average Ht. cm. | N-plants |
|---|---|---|---|
| 1A | 9.0 | 15.8 | 8 |
| 4B | 7.7 | 15.1 | 8 |
| Controls | 7.6 | 15.7 | 10 |

TABLE XXI

Marigold data in $F_1$

The following data show increased growth rate by treating on the radicle. Plants about three weeks old when data were taken (30 min. exposures-about 2 mm from root tip, H — 12 ma.)

| Treatment | Ave. growth rate and S.E. (mm/day) | N-plants |
|---|---|---|
| A | 0.94±0.26 | 15 |
| Controls | 0.71±0.22 | 15 |

Growth and development enhancement was observed four generations subsequent to the $F_1$ without further treatment.

EXAMPLE NO. 11 AGERATUM

TABLE XXII

Exposed 0.3 mm from tip of about 1 mm long radicles using 5 min. exposures (H=8 ma. for A treatments and H=8 ma., E=450 v. for B treatments) Data taken at 32 days growth

| Treatment | Changes in growth | N-plants |
|---|---|---|
| 1A | +20.2% | 5 |
| 3B | +4.1% | 5 |
| 6B | +8.2% | 7 |
| Controls | — | 9 |

EXAMPLE NO 12 ZINNIA

TABLE XXIII

Flowering data for Zinnia plants. A significant change in the number of petal layers occurred in two of the treatment types. A reduction in the time to flower is indicated.

Zinnia ($F_1$)

| Treatment type* | Days to Flower | Petal Layers per Flower | N-plants |
|---|---|---|---|
| 1A, 4B, 6B-15 min.-apical meristem | 49.8 | 2.40 | 5 |

TABLE XXIII -Continued

Flowering data for Zinnia plants. A significant change in the number of petal layers occurred in two of the treatment types. A reduction in the time to flower is indicated.

Zinnia (F$_1$)

| Treatment type* | Days to Flower | Petal Layers per Flower | N-plants |
|---|---|---|---|
| 1A, 4B, 6B-15 min.-apical meristem | 49.8 | 2.40 | 5 |
| 1A, 4B, 6B, 8C-1 hr.-ig**-endosperm | 48.8 | 3.47 | 15 |
| 1A, 5 min.-root tip-variable int | 47.8 | 4.54 | 24 |
| Controls | 52.0 | 4.30 | 23 |

\* The intensity was varied from 0.5 to 15 ma for the H field and from 60 to 600 v for the E field.
\*\* ig (initial germination)

In addition to the above data, the treated plants (combined) disclosed a marked increase in a branching abnormality. This consists of a single branch at the second node below the inflorescense (flower). The data are:

TABLE XXIV

| Conditions | Percent Plants with Single Branch | N-plants |
|---|---|---|
| Combined Treated Plants | 38.8% | 80 |
| Controls | 8.7% | 23 |

Zinnia flower size data showing size increases in groups treated at intensities of 0.5, 1.0, 2.0, 4.0, 8.0, and 15.0 ma. levels for H. In the table all intensities have been combined.

TABLE XXV

1A — Data for Around 60 Days' Growth

| Treatment | Average Flower Size | N-plants |
|---|---|---|
| 1A-5 min.-root tip | 3.76 cm | 24 |
| 1A-5 min.-0.8 mm from tip | 3.48 | 26 |
| Controls | 3.29 | 27 |

EXAMPLE NO. 13 CHRISTMAS CHERRY PLANT

Data for the "Christmas Cherry" plant. Applied 0.3 mm from root tip for 5 minutes intervals on radicles 0.5 - 1.5 mm in length.

TABLE XXVI

Growth Date — 50 days — 1A Type

| Intensity | Average ht. cm | ΔG-% | N-plants |
|---|---|---|---|
| 0 (controls) | 10.17 | — | 9 |
| 1.0 ma. | 11.93 | +17.3 | 8 |
| 8.0 ma. | 12.13 | +19.3 | 9 |
| 14.0 ma. | 12.55 | +23.4 | 7 |

EXAMPLE NO. 14 ORANGE TREE

The following data were obtained from growing orange tree plants in a greenhouse. In Tables XXVII, XXVIII and XXIX the various treatment types have been combined. The treatments were for 2 minute exposures at the radicle tip (H = 5 ma, E = 300 volts). It will be noted that in both tables XXVII and XXVIII for the A and B type treatments the growth of the orange trees was substantially enhanced over that of the untreated control plants. Also in Table XXIX the emergence time through the soil for all types of treatment were less than for the untreated control plants.

TABLE XXVII

Approx. 50 days growth-combined treatment types

| Treatment | Plant-ht. Ave. (cm) | Leaf Spread Ave. (cm) | Stem nodes Ave. | N-plants |
|---|---|---|---|---|
| A | 10.2 | 11.1 | 6.2 | 9 |
| B | 9.9 | 11.5 | 5.5 | 4 |
| Controls | 8.8 | 10.0 | 4.9 | 8 |

TABLE XXVIII

Approx. 30 days growth-combined treatment types

| Treatment | Plant-ht. Ave. (cm) | Leaf Spread Ave. (cm) | Stem nodes Ave. | N-plants |
|---|---|---|---|---|
| A | 4.4 | 4.5 | 2.3 | 6 |
| B | 4.7 | 4.5 | 2.5 | 11 |
| C | 3.2 | 4.2 | 1.6 | 3 |
| Controls | 4.0 | 4.2 | 2.0 | 11 |

TABLE XXIX

Comparison of germination rates in treated and control trees (emergence through soil)

| Treatment | Emergence time days (ave.) | N-plants |
|---|---|---|
| A | 7.6 | 21 |
| B | 9.3 | 15 |
| C | 9.0 | 5 |
| Controls | 9.5 | 17 |

EXAMPLE NO. 15 FIR AND PINE TREES

The following data are based on the treatment of germinating seeds from both the Ponderosa and Douglas Fir species. An analysis has been made both as to stem length and needle expansion. From this data it appears that the species are responding differently to the treatments. For example, the following tables show that the Douglas Fir indicates a slight growth increase in stem length and a decrease in needle length; whereas the Ponderosa Pine suggests a decrease in stem length and possibly an increase in needle length in some treatments

TABLE XXX

Stem Growth and Needle Development in Treated Douglas Fir specimens (2 min. H=8 ma., E=300 v)

| Treatment | Stem Gr-% | Needle Gr-% | N-plants |
|---|---|---|---|
| 2A | +11.5 | −12.1 | 3 |
| 3B | +1.6 | −17.8 | 3 |
| 8C | +12.8 | −6.5 | 2 |
| Controls | — | — | 3 |

TABLE XXXI

Stem and Needle Growth in Ponderosa Pine (5 min. H=12 ma. E=300v)

| Treatment | Stem Gr-% | Needle Gr-% | N-plants |
|---|---|---|---|
| 1A | −19.1 | +5.3 | 3 |
| 6B | −42.4 | +4.0 | 4 |
| 7C | −5.5 | −18.8 | 5 |
| Controls | — | — | 4 |

In addition to the above growth data, examination has been made of the emergence of the plants through the soil which shows that the controls are consistently retarded in relation to the treated series. This data is shown in Table XXXIII.

TABLE XXXIII

Comparison of Germination in Treated and Control Plants (6 to 10 plants per group, 2–5 min. H=2–12 ma., E=300–600v.)

| Treatment | GERMINATION — DAYS | |
|---|---|---|
| | PONDEROSA | DOUGLAS FIR |
| 1A | 5.2 | 5.0 |
| 6B | 4.8 | 6.0 |
| 7C | 6.0 | 7.0 |
| Controls | 6.0 | 7.8 |

EXAMPLE NO. 16 GRASSES (TIMOTHY, RYE & ST. AUGUSTINE)

The following tables XXXIV and XXXV illustrate specific treatments applied to Timothy and Rye grass for the purpose of reducing growth in these two types of grasses. The treatments were for exposure periods of 2 minutes.

TABLE XXXIV

Timothy — exposed on emerging radicle — Data for 15 days' growth

| Treatment | High Intensity (H=14 ma., E=600 v) | | Low Intensity (H=2 ma., E=150 v) | |
|---|---|---|---|---|
| | ΔG% | N-plants | ΔG% | N-plants |
| 1A | −26.4 | 4 | −17.4 | 3 |
| 2A | −6.8 | 4 | −19.6 | 4 |
| 3B | −3.8 | 3 | — | — |
| 4B | +18.0 | 4 | −4.7 | 4 |
| 5B | −26.0 | 4 | +11.4 | 4 |
| 6B | −1.5 | 4 | −17.4 | 4 |
| 7C | −8.7 | 3 | — | — |
| 8C | −13.7 | 4 | +11.7 | 4 |
| Controls | — | 14 | 13 | 12 |

TABLE XXXV

Rye Grass — 2 min. exposures
1 mm from tip - high intensity (H=4 ma., E=600 v) — data for 15 days' growth

| Treatment | ΔG% | N-plants |
|---|---|---|
| 1A | −15.7 | 3 |
| 2A | −10.9 | 4 |
| 3B | +15.2 | 4 |
| 4B | +19.2 | 3 |
| 5B | −17.4 | 4 |
| 6B | −37.0 | 3 |
| 7C | −9.7 | 3 |
| 8C | −5.2 | 4 |
| Controls | — | 15 |

The following Table XXXVI illustrates the effect of treatment on the growth rate of St. Augustine Grass. The stolons of different nodes were treated for the purpose of reducing growth. There were approximately five plants per node. The data was taken after approximately 20 days growth.

TABLE XXXVI

St. Augustine Grass — 5 min. exposures at the node High Intensity (H=12 ma., E=600 volts) — data for 20 days growth

| Average Stem Height (cm) | | | | | Node on Stem |
|---|---|---|---|---|---|
| Treatment Types | | | | Controls | |
| 1A | 2A | 3B | 8C | | |
| 4.8 | 16.5 | 17.3 | 6.5 | 18.5 | 1 |
| 14. | 14.8 | 16.3 | 13.8 | 12.8 | 2 |
| 14. | 7.6 | 3.4 | 1.7 | 8.7 | 3 |
| 2.2 | 3.8 | 2.8 | 4.1 | 5.6 | 4 |
| 3.0 | 1.8 | 2.3 | 3.4 | 5.0 | 5 |

EXAMPLE NO. 17 SUGAR BEETS

TABLE XXXVII

Sugar beet growth as a function of the treatment position on the radicle (1A-type-5-10 min. duration, intensities of 0.5, 1.0, 3.0 and 7.0 milliamps) 38 days growth

| Position on radicle | ΔG% | N-plants |
|---|---|---|
| radicle tip | +7.6 | 16 |
| 0.12 mm | −2.1 | 19 |
| 0.25 mm | −8.2 | 15 |
| 2.00 mm | +13.7 | 9 |
| Controls | — | 30 |

What is claimed is:

1. The method of reducing the vegetative growth of bean plants comprising applying a gradient magnetic field of from about 14 to 15 milliamps to the apical initial region of the root tip of newly germinated beans for a duration of about two minutes.

2. The method of promoting the vegetative growth of bean plants comprising applying a gradient magnetic field of about 2 milliamps to the apical initial region of the root tip of newly germinated beans for a duration of about 2 minutes.

3. The method of increasing pod production in bean plants comprising applying a gradient magnetic and/or electrostatic field to newly germinated bean roots in an area extending from the root tip to one centimeter therefrom, for a duration of from 2 minutes to 2 hours and wherein the magnetic field range is from about 2 to 14 milliamps and the electrostatic field range is from about 300 to 600 volts.

4. The method of reducing the vegetative growth of bean plants comprising applying a combined gradient magnetic field of about 14 milliamps and a gradient electrostatic field of about 600 volts to the apical initial region of the root tip of newly germinated beans for a duration of about 2 minutes.

5. The method of promoting the vegetative growth of tomato plants comprising applying a gradient magnetic and/or electrostatic field to the area of high dehydrogenase activity of the root tip of newly germinated tomato plants for a duration of about 2 minutes and wherein the magnetic field is about 2 milliamps and the electrostatic field is about 150 volts.

6. A method of promoting the stem growth and fruit lengths of cucumber plants comprising applying a gradient magnetic field or combination of gradient magnetic and electrostatic fields to the root tips of newly germinated cucumber plants for a duration of about 2 minutes and wherein the magnetic field is about 12 milliamps and the electrostatic field is about 600 volts.

7. A method of increasing the number of fruits on cucumber plants comprising applying a combination of gradient magnetic and electrostatic fields to the root tips of newly germinated cucumber plants for a duration of about 2 minutes wherein said magnetic field is about 12 milliamps and the electrostatic field is about 600 volts.

8. A method of hastening the flowering of carnations and snapdragons comprising applying a gradient magnetic and/or electrostatic field to the root tips of newly germinated plants for a duration of about 10 minutes wherein the magnetic field range is from about 2 to 10 milliamps and the electrostatic field range is from about 150 to 600 volts.

9. A method of promoting the vegetative growth of Christmas Cherry plants comprising applying a gradient magnetic field ranging from about 1 to 14 milliamps to the root tips of newly germinated plants for a duration of about 5 minutes.

10. The method of increasing pod and seed production and seed weights per plant in soybean plants comprising applying a gradient magnetic field of about 2 milliamps to the root tip of newly germinated soybean plants for a duration of about 2 minutes.

11. The method of increasing the growth of wheat plants comprising applying a gradient magnetic field of about 4 milliamps to the radicle at a distance of about 10 mm from the root tip for a duration of about 5 minutes.

12. The method of decreasing the growth of wheat plants comprising applying a gradient magnetic and electrostatic field to the radicle of wheat roots in an area extending from the root tip to about 10 mm therefrom for a duration of about 5 minutes and wherein the magnetic field has an intensity of about 4 milliamps and an electrostatic field of about 450 volts.

13. The method of promoting the vegetative growth and amount of foilage of alfalfa comprising applying a gradient magnetic field of about 2 milliamps at the radicle tip for a duration of about 5 minutes.

14. The method of increasing the flowering of marigolds comprising applying a gradient magnetic field of about 1 to 12 milliamps to the meristem region of the root after emergence from the seed coat for a duration of about 10 minutes.

15. The method of increasing the growth rate of marigolds comprising applying a gradient magnetic field of about 12 milliamps to the radicle of the marigold plants at about 2 mm from the root tip for a duration of about 30 minutes.

* * * * *